United States Patent
Chen et al.

(10) Patent No.: US 7,740,389 B2
(45) Date of Patent: Jun. 22, 2010

(54) LIQUID CRYSTAL DISPLAY WITH LIGHT GUIDE PLATE AND LIGHT SOURCE DISPOSED ABOVE THE LIGHT GUIDE PLATE

(75) Inventors: Fei-Hong Chen, Shenzhen (CN); Che-Kuei Mai, Miao-Li (TW)

(73) Assignees: Innocom Technology (ShenZhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 191 days.

(21) Appl. No.: 11/906,384

(22) Filed: Oct. 1, 2007

(65) Prior Publication Data
US 2008/0080208 A1 Apr. 3, 2008

(30) Foreign Application Priority Data
Sep. 29, 2006 (TW) .............................. 95136323 A

(51) Int. Cl.
*F21V 7/04* (2006.01)
(52) U.S. Cl. ....................................... 362/609; 362/628
(58) Field of Classification Search ................. 362/608, 362/609, 610, 612, 621, 623, 628
See application file for complete search history.

(56) References Cited

U.S. PATENT DOCUMENTS

| 5,390,085 | A | * | 2/1995 | Mari-Roca et al. | .......... 362/609 |
| 6,871,973 | B2 | | 3/2005 | Ju | |
| 7,056,001 | B2 | * | 6/2006 | Chuang | .......... 362/561 |
| 7,513,669 | B2 | * | 4/2009 | Chua et al. | .......... 362/606 |
| 2004/0151007 | A1 | * | 8/2004 | Chuang | .......... 362/561 |
| 2006/0012731 | A1 | | 1/2006 | Ishiwa et al. | |

FOREIGN PATENT DOCUMENTS

| CN | 1721938 A | 1/2006 |
| JP | 2000075316 A | 3/2000 |

* cited by examiner

*Primary Examiner*—David V Bruce
(74) *Attorney, Agent, or Firm*—Wei Te Chung

(57) ABSTRACT

A liquid crystal display (200) includes a transparent substrate (25), a light guide plate (28) disposed under the substrate, and a light source (29) disposed above the light guide plate at a thin side of the substrate. The light guide plate includes a top surface (280). An area of the top surface corresponding to the light source defines a light incident area, and another area of the top surface corresponding to the substrate defines a light emitting area.

13 Claims, 2 Drawing Sheets

LIQUID CRYSTAL DISPLAY WITH LIGHT GUIDE PLATE AND LIGHT SOURCE DISPOSED ABOVE THE LIGHT GUIDE PLATE

FIELD OF THE INVENTION

The present invention relates to liquid crystal displays (LCDs), and particularly to an LCD with a light guide plate (LGP) and a light source disposed above the LGP.

GENERAL BACKGROUND

Liquid crystal displays are commonly used as displays for compact electronic apparatuses. This is because they not only provide good quality images with little power consumption, but also because they are very thin. The liquid crystal in a liquid crystal display does not emit any light itself. The liquid crystal has to be lit by a light source so as to clearly and sharply display text and images. Thus, a backlight module is generally needed for a liquid crystal display.

Referring to FIG. 4, a conventional LCD 100 includes an LCD panel 11, and a backlight module 12 at one side of the LCD panel 11. The backlight module 12 provides a planar light source to illuminate the LCD panel 11.

The LCD panel 11 includes a first polarizer 13, a first substrate 14, a liquid crystal layer 141, a second substrate 15, a second polarizer 16, a flexible printed circuit (FPC) 151, and a printed circuit board (PCB) 152. The first substrate 14 and the second substrate 15 are disposed parallel to each other, and are spaced apart a predetermined distance. The liquid crystal layer 141 is interposed between the first substrate 14 and the second substrate 15. The first polarizer 13 is disposed on an outer surface of the first substrate 14, and the second polarizer 16 is disposed on an outer surface of the second substrate 15. One terminal of the FPC 151 is connected to the PCB 152, and another terminal of the FPC 151 is disposed on an edge portion of the second substrate 15. The second substrate 15 includes a plurality of driver circuits (not shown). The driver circuits are electrically connected to the FPC 151.

The backlight module 12 includes a set of optical films 17, a light guide plate (LGP) 18, a light source 19, and a reflective film 190. The LGP 18 has a generally rectangular shape, and includes a light incident surface 181, a light emitting surface 182 adjoining the light incident surface 181, and a bottom surface 185 adjoining the light incident surface 181. The light source 19 is disposed adjacent to the light incident surface 181 of the LGP 18. The set of optical films 17 is disposed adjacent to the light emitting surface 182 of the LGP 18. The reflective film 190 is disposed adjacent to the bottom surface 185 of the LGP 18. The light source 19 can be a linear light source.

In operation, light beams emitting from the light source 19 enter the LGP 18 through the light incident surface 181 thereof. Some of the light beams subsequently exit the light emitting surface 182 of the LGP 18, pass through the set of optical films 17, and finally reach the LCD panel 11. Other of the light beams subsequently exit the bottom surface 182 of the LGP 18, are reflected by the reflective film 190 back into the LGP 18, exit the light emitting surface 182 of the LGP 18, pass through the set of optical films 17, and finally reach the LCD panel 11. In this way, the backlight module 12 effectively changes the linear light source 19 into a surface light source, which evenly illuminates a whole display screen area of the LCD panel 11.

With innovations in science and technology, the LGP 18 is capable of being made very thin; for example, in the range from 0.7 mm to 0.45 mm. However, light source technology has not kept up with advances in LGP technology. Generally, a corresponding minimum thickness of the light source 19 is about 0.6 mm. Therefore it is common for the light source 19 to be thicker than the LGP 18. In such case, an area of the light incident surface 181 is less than a light emitting area of the light source 19. Thus, the efficiency of utilization of light energy of the light source 19 may be unsatisfactory.

What is needed, therefore, is an LCD that can overcome the above-described deficiencies.

SUMMARY

In one aspect, a liquid crystal display includes a transparent substrate, a light guide plate disposed under the substrate, and a light source disposed above the light guide plate at a thin side of the substrate. The light guide plate includes a top surface. An area of the top surface corresponding to the light source defines a light incident area, and another area of the top surface corresponding to the substrate defines a light emitting area.

In another aspect, a liquid crystal display includes a light guide plate, a transparent substrate disposed above the light guide plate, and a light source disposed above the light guide plate. The light guide plate includes a generally rectangular portion and a wedge-shaped portion at an end of the rectangular portion. The rectangular portion of the light guide plate corresponds to the substrate, and the wedge-shaped portion of the light guide plate corresponds to the light source. Light beams emitting from the light source enter the wedge-shaped portion of the light guide plate, and at least a portion of the light beams exit the rectangular portion of the light guide plate and enter the substrate.

Other aspects, advantages and novel features will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe preferred and exemplary embodiments in detail.

Figure 1:
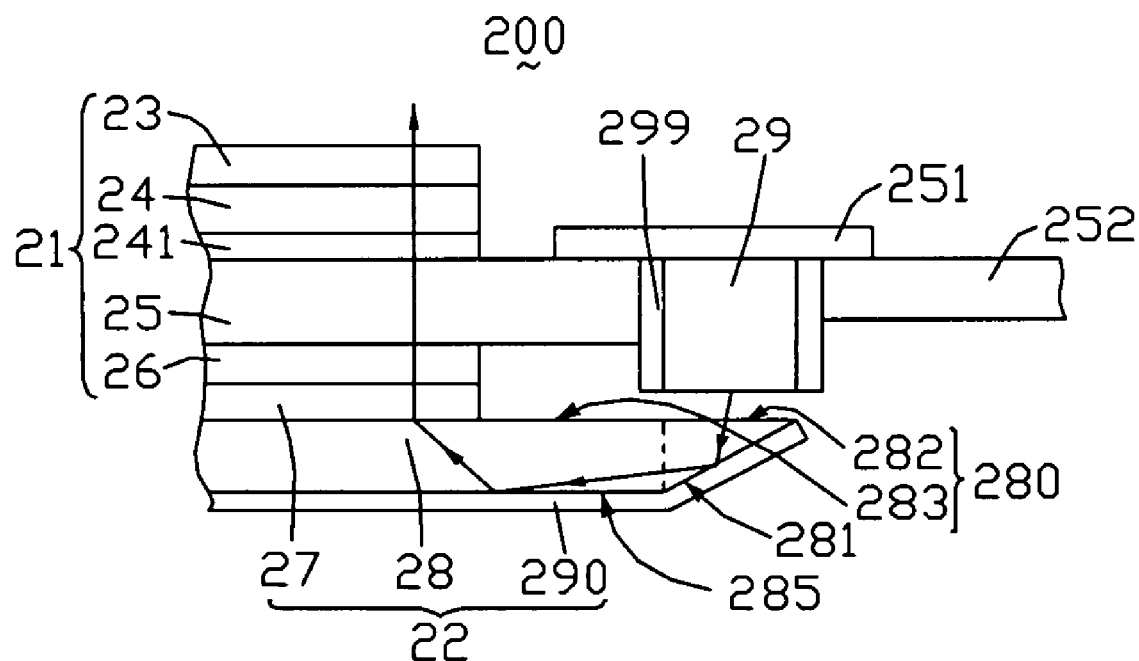
FIG. 1 is a side cross-sectional view of part of an LCD according to a first embodiment of the present invention, showing an essential optical path thereof.

Referring to FIG. 1, an LCD 200 according to a first embodiment of the present invention is shown. The LCD 200 includes an LCD panel 21, and a backlight module 22 at one side of the LCD panel 21. The backlight module 22 provides a planar light source to illuminate the LCD panel 21.

The LCD panel 21 includes a first polarizer 23, a transparent first substrate 24, a liquid crystal layer 241, a transparent second substrate 25, a second polarizer 26, an FPC 251, and a PCB 252. The first substrate 24 and the second substrate 25 are disposed parallel to each other, and are spaced apart a predetermined distance. The liquid crystal layer 241 is interposed between the first substrate 24 and the second substrate 25. The first polarizer 23 is disposed on an outer surface of the first substrate 24, and the second polarizer 26 is disposed on an outer surface of the second substrate 25. One terminal of the FPC 251 is connected to the PCB 252, and another terminal of the FPC 251 is disposed on an edge portion of the second substrate 25. The second substrate 25 includes a plurality of driver circuits (not shown). The driver circuits are electrically connected to the FPC 251.

The backlight module 22 includes a set of optical films 27, an LGP 28, a light source 29, a reflective film 290, and a frame 299. The light source 29 is disposed on a bottom surface of the FPC 251 by means of surface mount technology, and is electrically connected to the FPC 251. In this position, the light source 29 is generally adjacent to a side edge of the LGP 28. The frame 299 facilitates fixing of the light source 29 in position on the FPC 251. The light source 29 emits light beams in downward directions, and the frame 299 prevents light leakage from occurring in side directions. The light source 29 includes a plurality of aligned light emitting diodes.

The LGP 28 has a generally rectangular shape, and includes a top surface 280, a bottom surface 285, and a side surface 281 adjoining the top surface 280 and the bottom surface 285. An area of the top surface 280 corresponding the light source 29 defines a light incident area 282, and another area of the top surface 280 defines a light emitting area 283. An angle between the side surface 281 and the top surface 280 is an acute angle. A vertical projection of the side surface 281 has an area equal to the light incident area 282. The set of optical films 27 is disposed adjacent to the light emitting area 283 of the LGP 28. The reflective film 290 is disposed adjacent to the bottom surface 285 and the side surface 281 of the LGP 28.

In operation, light beams emitting from the light source 29 enter the LGP 28 through the light incident area 282 and are reflected by the side surface 281 and the reflective film 290 thereat. Some of the light beams subsequently exit the light emitting area 283 of the LGP 28, pass through the set of optical films 27, and finally reach the LCD panel 21. Other of the light beams subsequently exit the bottom surface 285 of the LGP 28, are reflected by the reflective film 290 back into the LGP 28, exit from the light emitting area 283 of the LGP 28, pass through the set of optical films 27, and finally reach the LCD panel 21. In this way, the backlight module 22 effectively changes the linear light source 29 into a surface light source, which evenly illuminates a whole display screen area of the LCD panel 21.

In summary, the light source 29 is disposed on the FPC 251, and the light incident area 282 can be easily configured to vary in size and shape according to the particular light source 29 used. Thereby, no matter how thin the LGP 28 is, the light beams emitted from the light source 29 can be efficiently introduced into the LGP 28. That is, the ratio of utilization of light energy of the light source 29 is enhanced.

Figure 2:
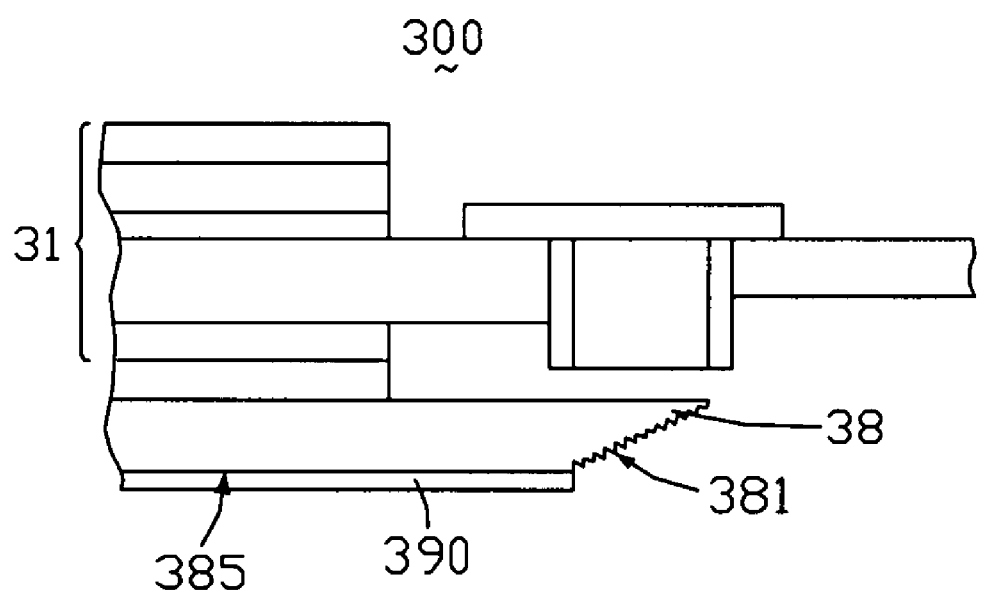
FIG. 2 is a side cross-sectional view of part of an LCD according to a second embodiment of the present invention.

FIG. 2 is a side cross-sectional view of part of an LCD 300 according to a second embodiment of the present invention. The LCD 300 has a structure similar to that of the LCD 200 of the first embodiment. However, a side surface 381 of an LGP 38 has a continuous V-cut structure. The V-cut structure can effectively reflect light beams reaching the side surface 381. Then the light beams transmit inside the LGP 38, exit the LGP 38, and finally illuminate a whole display screen area of an LCD panel 31. In the illustrated embodiment, a reflective film 390 is disposed adjacent to a bottom surface 385 of the LGP 38.

Figure 3:
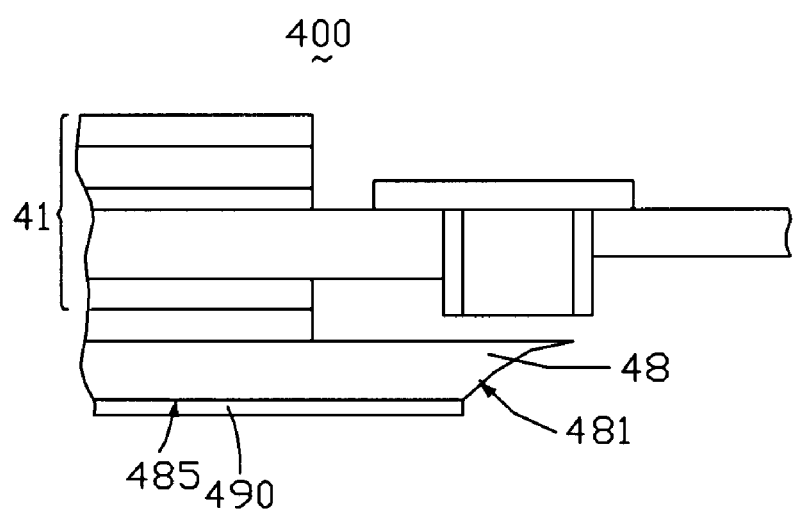
FIG. 3 is a side cross-sectional view of part of an LCD according to a third embodiment of the present invention.
Figure 4:
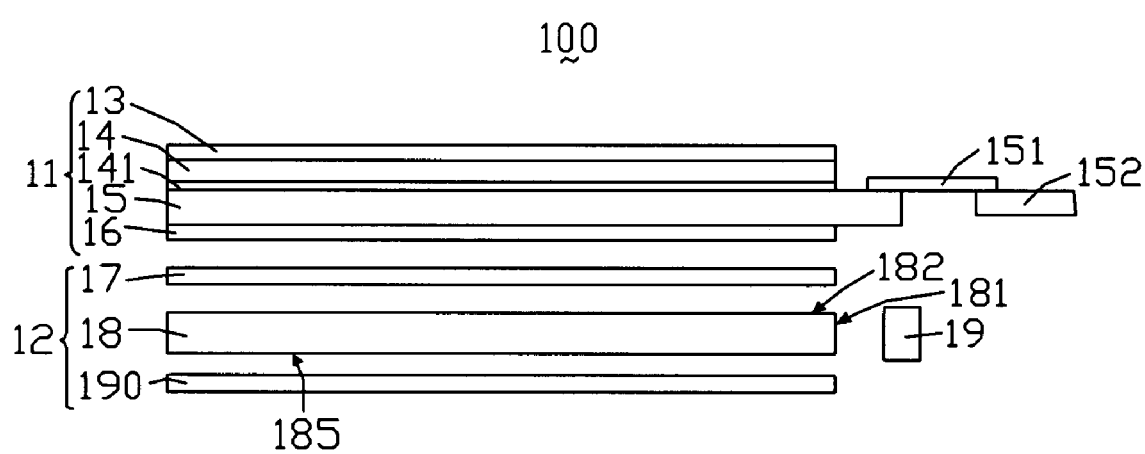
FIG. 4 is an exploded, side view of a conventional LCD.

FIG. 3 is a side cross-sectional view of part of an LCD 400 according to a third embodiment of the present invention. The LCD 400 has a structure similar to that of the LCD 200 of the first embodiment. However, a side surface 481 of an LGP 48 is a concave surface. The concave surface can effectively reflect light beams reaching the side surface 481. Then the light beams transmit inside the LGP 48, exit the LGP 48, and finally illuminate a whole display screen area of an LCD panel 41. In the illustrated embodiment, a reflective film 490 is disposed adjacent to a bottom surface 485 of the LGP 48.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display, comprising:
a transparent substrate;
a light guide plate disposed under the substrate; and
a light source disposed above the light guide plate at a thin side of the substrate;
wherein the light guide plate comprises a top surface and a side surface adjacent to the top surface, an area of the top surface corresponding to the light source defines a light incident area, another area of the top surface corresponding to the substrate defines a light emitting area, and the side surface comprises a continuous V-cut structure.

2. The liquid crystal display as claimed in claim 1, wherein an angle between the side surface and the top surface is an acute angle.

3. The liquid crystal display as claimed in claim 1, wherein the light guide plate further comprises a bottom surface.

4. The liquid crystal display as claimed in claim 3, further comprising a reflective film disposed adjacent to the bottom surface and the side surface of the light guide plate.

5. The liquid crystal display as claimed in claim 3, further comprising a reflective film disposed adjacent to the bottom surface of the light guide plate.

6. The liquid crystal display as claimed in claim 1, further comprising a flexible printed circuit, wherein a terminal of the flexible printed circuit is disposed on an edge portion of the substrate.

7. The liquid crystal display as claimed in claim 6, wherein the light source is disposed on a bottom surface of the flexible printed circuit and electrically connected to the flexible printed circuit, and is positioned opposite to the light guide plate.

8. The liquid crystal display as claimed in claim 1, wherein the light source comprises a plurality of light emitting diodes.

9. The liquid crystal display as claimed in claim 1, further comprising at least one optical film disposed between the light emitting area of the light guide plate and the substrate.

10. A liquid crystal display, comprising:
a light guide plate comprising a generally rectangular portion and a wedge-shaped portion at an end of the rectangular portion, the wedge-shaped portion comprising an inclined surface with a continuous V-cut structure;
a transparent substrate disposed above the light guide plate; and
a light source disposed above the light guide plate;
wherein the rectangular portion of the light guide plate corresponds to the substrate, the wedge-shaped portion of the light guide plate corresponds to the light source, light beams emitting from the light source enter the wedge-shaped portion of the light guide plate, the inclined surface of the wedge-shaped portion reflects the light beams in the wedge-shaped portion generally toward the rectangular portion of the light guide plate, and at least a portion of the light beams exit the rectangular portion of the light guide plate and enter the substrate.

11. A liquid crystal display, comprising:
a transparent substrate;
a light guide plate disposed under the substrate; and
a light source disposed above the light guide plate at a thin side of the substrate;
wherein the light guide plate comprises a top surface and a concave side surface adjacent to the top surface, an area of the top surface corresponding to the light source defines a light incident area, and another area of the top surface corresponding to the substrate defines a light emitting area.

12. The liquid crystal display as claimed in claim 11, wherein the light guide plate further comprises a bottom surface.

13. The liquid crystal display as claimed in claim 12, further comprising a reflective film disposed adjacent to the bottom surface of the light guide plate.

* * * * *